United States Patent

Veith

[15] 3,688,281

[45] Aug. 29, 1972

[54] METHOD AND DEVICE FOR RETRIEVING INFORMATION FROM A HOLOGRAM MATRIX

[72] Inventor: Werner Veith, Munich, Germany

[73] Assignee: Siemens Aktiengesellschaft, Berlin and Munich, Germany

[22] Filed: March 29, 1971

[21] Appl. No.: 128,887

[30] Foreign Application Priority Data

April 3, 1970 Germany..........P 20 16 114.2

[52] U.S. Cl..........340/173 LM, 340/173 CR, 315/21 MR, 350/315, 350/160 R

[51] Int. Cl...........................................G11c 13/04

[58] Field of Search...340/173 LT, 173 LM, 173 CR; 350/3.5, 160 R; 315/21 MR

[56] References Cited

UNITED STATES PATENTS 3,518,634 6/1970 Ballman.....................340/173

3,543,248 11/1970 Oliver.......................340/173

*Primary Examiner*—Terrell W. Fears

*Attorney*—Hill, Sherman, Meroni, Gross & Simpson

[57] ABSTRACT

A method and device for retrieving information from a matrix of holograms arranged in columns and rows characterized by illuminating the matrix of holograms with a laser illumination and focusing the hologram images on a matrix of photosensitive cells arranged in columns and rows corresponding to the columns and rows of the matrix of holograms, scanning the matrix of photosensitive cells one column at a time and collecting the information transferred to each of the photosensitive cells of the column from its respective hologram. One embodiment of the invention utilizes photoconductive devices for the photosensitive cells of the matrix and an electron beam which is deflected either in a curve path to project on a column with a vertical angle thereto or is deflected twice to insure a vertical angle of incidence on the column. Another embodiment of the invention utilizes a method and apparatus in which the photosensitive cells are photoemissive devices which emit electrons to create an electronic image and includes means for deflecting the image to pass portions from an individual column of the photodevices through a slot onto electron collecting means to obtain the information transferred to the photodevices.

12 Claims, 4 Drawing Figures

INVENTOR
Werner Veith
BY
Hill, Sherman, Meroni, Gross & Simpson
ATTYS.

METHOD AND DEVICE FOR RETRIEVING INFORMATION FROM A HOLOGRAM MATRIX

BACKGROUND OF THE INVENTION

1. Field of the Invention

The present invention is directed to a method and apparatus for retrieving information from a matrix of holograms by projecting the images from the matrix of holograms on a photosensitive matrix and then obtaining the electrical signals therefrom.

2. Prior Art

It has been suggested to utilize a modern constant value memory hologram to store a point matrix which hologram when illuminated with a laser beam recreates the point matrix. It has also been suggested instead of using an individual hologram, to use a matrix of individual holograms, which are designated as sub-holograms, to contain individual bits of information. However, in order to utilize a matrix of holograms, the speed of retrieving the information therefrom should be very fast and possibly in the order of one microsecond for retrieving the desired information from a matrix.

In converting an optical image into an electrical signal such as creating a video signal in a television camera various types of equipment such as a vidicon or an image dissector tube, which have a matrix of photosensitive cells, have been used. In a vidicon, a matrix of photoconductive devices receives a visual image and is scanned one device at a time by an electron beam which causes an electrical signal depending on the brightness of light hitting the particular cell to create a video signal. An image dissector tube utilizes a matrix of photoemissive devices which when subjected to light emit electrons to create an electronic image on a plate having an aperture and the image is scanned by deflecting it with respect to the aperture to allow the electrons from individual photoemissive cells to pass through the aperture to an electron collector which creates the video signal.

SUMMARY OF THE INVENTION

The present invention is directed to a method and apparatus for retrieving information stored in a matrix of optical storage means such as holograms which are arranged in rows and columns by illuminating the entire matrix and focusing the light images on a matrix of photosensitive cells arranged in corresponding columns and rows to transfer the information thereto, scanning the matrix of photosensitive cells one column at a time and simultaneously collecting all the information contained in each of the cells of the scanned column. One embodiment of the method and apparatus utilizes photoconductive devices in the matrix of photosensitive cells which are scanned by an electron beam to conduct an electrical signal therefrom in response to the information transferred to the cells which beam strikes the column of photoconductive devices with a vertical impact angle. Another embodiment of the method and apparatus of the present invention utilizes a matrix of photoemissive devices which emit electrons from an electronic image and the information is retrieved from an individual column by deflecting the electronic image of the column being scanned to pass through a slot onto electron collectors.

DESCRIPTION OF THE PREFERRED EMBODIMENTS

Figures 1, 2, 3, 4:
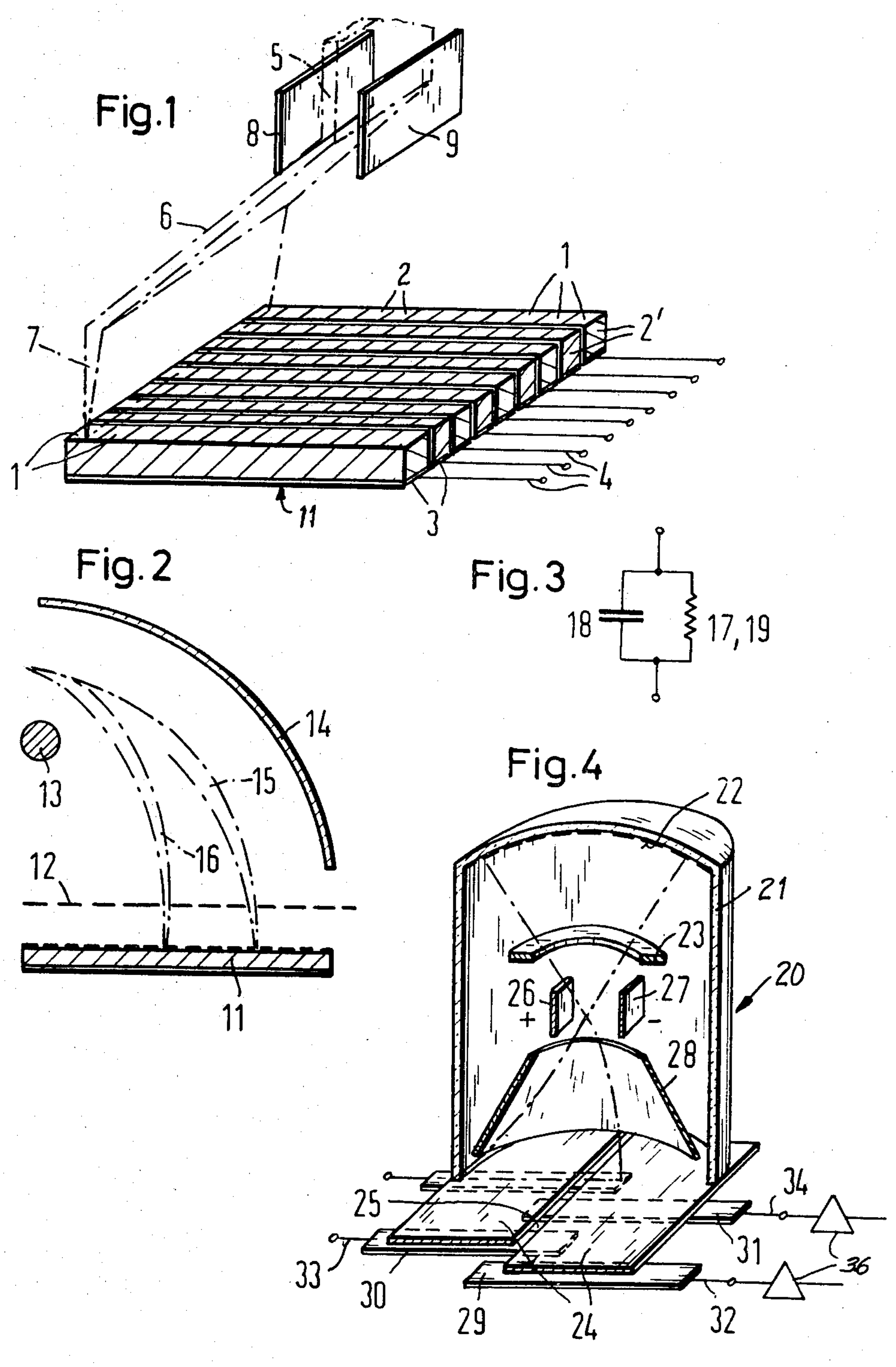
FIG. 1 is a schematic representation of a light detecting matrix and the scanning electron beam.
FIG. 2 represents a possible method of deflecting the electron beam onto a light detecting matrix such as illustrated in FIG. 1.
FIG. 3 is a schematic illustration of the circuit diagram of the photocells utilized in the embodiment of FIGS. 1 and 2; an FIG. 4 shows an embodiment of the device and method of retrieving information from an optical storage means.

The principles of the present invention are utilized in an apparatus for performing a method of retrieving information from an optical storage means. The optical storage means as mentioned above, is preferably a matrix of individual hologram arranged in a rectangular pattern of columns and rows with 128 columns and 144 rows of sub-holograms. The information stored in the sub-holograms may be in a digital manner so that when illuminated by a laser, the hologram is either light or dark depending on the information stored therein such as the yes or no signal. Usually the information stored in each column of 144 sub-holograms is designated in a general customary manner as a "word" which preferably is used as a single information message. In order to increase the speed of retrieving the information from the matrix and to simultaneously retrieve the "word", it is desirable to be able to retrieve the information contained from a particular column simultaneously. Furthermore, if the matrix has 128 columns, it is desirable to be able to retrieve the information from each of the columns in any desired sequence which may be different than the sequence for retrieving material from a different storage matrix.

The principles of the present invention are particularly adapted for a device and method for retrieving information from a matrix of holograms. A device such as illustrated schematically in FIG. 1 for retrieving the information includes a detector matrix 11 of photosensitive cells such as photo diodes 2 which are arranged in columns 1 and rows 2' extending perpendicular to the column 1. All the photo diodes 2 of said row 2' are electrically connected to a conductive strip or coating 3 with each of these strips 3 having a separate conductor 4 which extends out of the envelope or discharge vessel for connection to an electrical circuit for utilizing the electrical signal conducted thereby. The electrical circuit may include an amplifier for each conductor 4. The number of columns 1 and rows 2' of the detector matrix 11 correspond to the number of columns and rows of the matrix of holograms and thus the detector matrix 11 has 128 columns 1, with 144 rows of photosensitive cells 2.

The photo diodes used in the matrix of FIG. 1 are scanned by a band like electron beam 5 which has a length and width to cover all the photoelectric cells 2 of a column 1 simultaneously. As illustrated, the beam 5 to strike a particular column is deflected by a first deflecting condenser having plates 8 and 9 into a deflected path 6 and is deflected a second time immediately ahead of contact with the matrix 11 by being subjected to an additional static deflection field into a path 7 which strikes the photosensitive cells of a column 1 with a substantial vertical angle of impact. By controlling the amount of deflection caused by the plates 8 and 9, the angle of deflection of the beam 5 into the path 6 is varied to selectively scan a particular column 1 of photosensitive devices. Thus, the electron beam strikes all the photosensitive cells 2 of an entire column 1 simultaneous but as mentioned above, each of the cells 2 of a column is individually connected to a separate conductive strip 3 and conductor 4 which individually conduct the information signal from each cell 2 to an appropriate electrical circuit for utilization.

In the arrangement illustrated in FIG. 1, several problems can occur during the retrieving of the information from the matrix of photosensitive cells. For example, the operating conditions of the device determined by the electron optics and with regard to the time constants of the photosensitive cells. The electron optics must take place in such a manner that the electron band beam 5 has a uniform thickness (strength) approximately equal to the width of the photosensitive cell, which is approximately 100 microns for each cell 2 in each of the individual rows 2′, and the deflection of the beam 5 must preserve this uniform strength for each of the cells of the column 1 being scanned. Furthermore, as in a vidicon device, the electron beam must be braked to almost zero volts and have an impact angle of 90° on the target formed by the matrix 11 of photocells. As with the thickness and strength of the beam, the band-like electron beam must impact on all of the 144 photosensitive cells of the column and must impact with substantially the same vertical impact angle on each of the selected columns. It should be noted, that such conditions for electron beam are not mandatory in a simple deflection device such as an electrostatic oscilloscope tube. Thus unlike an electron oscilloscope tube, the beam must be deflected a second time prior to the impact or the target column so that it impacts vertically on the entire surface of the column.

The matrix 11 of the photosensitive cells, the deflecting plates 8 and 9, a means for generating the electron beam 5 are all contained in an envelope or discharge vessel which is not illustrated. The matrix 11 formed of the photosensitive cells 2 is located on a wall of the envelope or adjacent thereto so that it can be illuminated by a light source to transfer information to the photosensitive cells 2.

Another example of a device for scanning a light detecting matrix by deflecting an electron band beam in a different manner is illustrated in FIG. 2. To deflect an electron band beam, a positively bias rod or bar-like electrode 13 having an axis that is parallel to a face or surface of the matrix 11 is utilized in conjunction with a negatively bias second electrode 14 having a curve surface with an axis of curvature which is both parallel to the rod-like electrode 13 and the face of the matrix 11. As illustrated, the electrode 14 is a sheet of material curved about an axis and having a cross section of substantially a quarter circle. Between the electrodes 13 and 14 and the matrix 11, a fine mesh field net 12 is stretched parallel to the matrix and spaced from a face thereof.

A band beam of electrons is generated and projected substantially parallel to the matrix 11, and between the electrodes 13 and 14. The potential of the positively biased rod electrode 13 and negatively biased electrode 14 creates a potential field in the area between the electrodes 13 and 14 and a second field with the field net 12 to deflect or curve the electron band beam into a path such as 15 which is focused to strike a column of photocells with the substantially vertical impact angle. With an increase of the positive bias of the electrode 13, the potential field between the electrodes 14 and 13 curves and deflects the band beam to a shorter radius of curvature with a narrower path 16 which impacts on a different column of photosensitive cells. By varying the field potential between electrodes 13 and 14, the radius of curvature of the electron beam band is changed to selectively hit any of the columns of the matrix 11. The field net 12 also functions to aspirate release secondary electron caused by the impact of the beam on the photosensitive cells.

This method of deflecting is a particularly advantageous manner to obtain dependable and precise deflection which results in the electron beam bombarding selected columns of the matrix 11.

In utilizing either of the apparatus as illustrated schematically in FIG. 1 and FIG. 2, the storage matrix of hologram are illuminated by a laser to create a series of hologramic images which are focused on the photosensitive cells of the matrix 11 which the holograms of one column of the matrix being focused on its respective column of photosensitive cells of the matrix 11. Depending on the information contained in the individual sub-holograms, the focus hologram image will either illuminate or not illuminate its respective photosensitive cell and thus transfer information such as a yes or no signal to the photosensitive cells.

All of the photocells 2 which have been illuminated will have a lower potential than the non-illuminated cells and when the illuminated cells of a column are bombarded by the scanning beam, each of the illuminated cells will have a current flow which generates a signal in the collection means formed by the strip 3 and conductor 4, which signal can be amplified to determine the information in that particular cell. It should be noted that while all of the photoconductive cells 2 in a single row are electrically connected to the same conductive strip 3 and conductor 4, only a single cell in each row is bombarded by the electron beam at one instant of time. Thus by knowing the particular column being scanned, the particular cell information or signal received from a particular conductor 4 is attributed to the information transferred to a particular photoconductive device of that row.

The matrix 11 whether used with the device illustrated in FIG. 1 or FIG. 2 utilizes a plurality of photoconductive devices or photodiodes which must have certain electrical properties. For example, it is undesirable to use diodes like those used in a Si-screen vidicon which are diodes that are doped to form a high-ohmic pn-layer which are required in a vidicon. In a vidicon, the time constant which is obtained by multiplying the ohmic resistance and the capacity of the blocking layer, must be greater than one-thirtieth of a second. Such a value causes electron beams scanning the surface to charge the target surface above the signal plate positive voltage (+10 volts) to 0 volts (the cathode potential) and this charge to hold until the next scanning of the surface. If meanwhile the individual photoelectric cells are exposed, the voltage of the capacitor breaks down to a lower value by integration of the individual light quantum with the amount of breakdown depending on the amount of illumination so that a subsequent electron beam scan to bring the potential of the target to the zero value causes a current flow between the signal plate and diode to generate a signal which is delivered to an amplifier connected to the diode. If photocells of this kind were used in the detector matrix 11, all columns not scanned but illuminated by the laser beam would be reduced in their potential, that is the photo devices of the columns would not have the zero value. If the photodiodes in the columns not scanned had been illuminated, they would continue to maintain this reduced potential with a storage effect of the information projected or transferred thereto. Thus subsequent illumination of the matrix 11 with a different hologram with the matrix being scanned would comix the information from two different hologram matrixes and give erroneous readings. Thus the matrix of the photoconductive cells or devices of the present invention should have the property of a time constant in this order of one micron to reduce the storage effect. This property is achieved by particular selection of materials of photoelectric cells and/or by corresponding doping. For example, a matrix as of p–Si which are insulated from n–Si by a layer created by doping the n–Si surface with Boron. Another example are barrier diodes of semiconductors with a metal base such as gallium-arsenic or gallium-phosphide.

The photoconductive cell matrix 11 of the described kind will generate a signal different from the generation of a signal in a vidicon which signal of the matrix 11 will resemble the signal generated by a conductron (see in this regard a French article by Dr. Veith in Le Vide [The Vacuum], 1950). In fact, by scanning with the aid of electron beams at a positive plate potential it is impossible to charge the surface of the target diodes to zero volts for a possible existing charge may collapse due to the very small conductive value of the pn-layer within a 1 microsecond. Thus a capacitive signal current occurs at each photoelectric cell which is scanned by the electron beam and at the points which were exposed the signal current is increased by an increase ohmic conductive value.

FIG. 3 schematically shows the internal circuitry of the photo device. The condition of an unexposed photocell, with the capacity 18 and a high resistance 17 is represented by the circuit diagram. In the exposed condition, the high resistance 17 of the device is replaced by a smaller ohmic resistance 19 which enables the potential of the device to decrease by the increased conductivity.

An embodiment of the method and apparatus for retrieving information from a matrix of sub-hologram utilizes a device generally indicated at 20 in FIG. 4 which is similar to an image dissector tube such as suggested by Farnsworth. In FIG. 4, the device 20 is an electrostatically focused image converter with the photo cathode 22 at one end of an envelope 21 which cathode 22 is provided with photosensitive cells arranged in columns and rows. The cells are photoemissive materials which will emit electrons when subject to light such as illumination from a laser illuminated storage matrix of holograms. The device 20 further includes an anode 23, a shielding baffle plate anode 24 having means defining a slot 25. The photoemissive devices of the photocathode 22 when illuminated emit electrons which are focused by the anode 23 and the baffle plate 24 into an electronic image. The image is deflected by deflecting means such as by the deflection plates 26 and 27 to enable a portion of the electron image originating from a particular column of cells to pass through the slot 25 and fall on a plurality of collectors 29, 30, 31, etc. with one collector for each device on a column. The collectors are located behind the slot 25 and have electrical conductors 32, 33, 34, etc. extending out of the envelope 21, or discharge vessel 21 with alternate conductors extending in alternate directions. Since the deflection of the image by the plates 26 and 27 may distort the image, a correcting lens including an additional conical shell electrode 28 is placed adjacent the baffle plate 24 so that even under the strongest deflection by the plates 26 and 27, the beams electron image and a portion for a column of photo device of a given column will still produce a straight line image.

The device offers special advantages for retrieving information from the stored optical matrix because electron emission of the photoelectric cells is considered to be substantially free of inertia and will stop when the illumination thereof ceases. Electrons which pass through the slot 25 which is dimensioned to allow all the electrons emitted from a column of the photoemitting devices to pass through the shielding means 24 impact on the collector aligned for the particular photo electric device. Thus each collector receives only the electron emitted from one device.

As electrons from a given column pass through the slot 25, they impact on the collectors 29, 30, 31, etc., and generate a signal current which stops as soon as the exposing of the photocathode is stopped, which enables the system to be substantially free from inertia. The sensitivity of the device can be increased by passing the current generated by the electrons passing through the slot 25 and striking the collectors 29–30, etc. through the respective conductors 32–34 each of which may be connected to a secondary emission multiplier stage in the form of a channel amplifier 36 to increase the signal to a higher level. By using an amplifier with each of the conductors 32–35, etc., a laser of weak illumination can be used in the retrieval operation.

Since the emission from the photocathode 22 stops when the illuminator stops, the apparatus 20 can selectively retrieve information from a single column of the storage matrix to obtain the "word" expression contained therein. Then a different storage matrix can be positioned and illuminated to retrieve information therefrom without information of the previous storage cell causing any interference or carry over.

Although the present invention has been discussed with regard to retrieving information from matrixes of holograms utilizing laser illumination, the devices can be utilized for retrieving information from any matrix of optical stored information which is projected on the matrix of photosensitive devices by any desirable light source.

Although minor modifications might be suggested by those versed in the art, it should be understood that I wish to employ within the scope of the patent warranted hereon all such modifications that reasonably and properly come within the scope of my contribution to the art.

I claim as my invention:

1. A method for retrieving information from a matrix of individual holograms arranged in columns and rows with a device having a matrix of photosensitive cells arranged in corresponding columns and rows comprising the steps of:
illuminating the matrix of holograms with laser illumination and focusing the hologram images on the matrix of photosensitive cells to transfer the information of the matrix of holograms to the matrix of photosensitive cells;
simultaneously scanning all of the photosensitive cells in a column of a matrix of the photosensitive cells; and
collecting the information transferred to each of the photosensitive cells from the hologram images from the scanned column.

2. A method according to claim 1, wherein said matrix of photosensitive cells is a matrix of photo conductive devices with each photoconductive device of a row being connected to the same electrical conductor extending out of the device; and wherein said step of scanning includes the steps of:
projecting an electron beam having a width of one photo device and the length of one column of devices to cause an electrical signal to flow from each of the devices in accordance with the information transferred respectively thereto; and
controlling the path of the electron beam by deflecting the beam to project on the selected column of photoconductive devices with the beam having a substantially vertical impact on the photoconductive devices.

3. A method according to claim 2, wherein said step of controlling includes focusing the beam on the selected column by deflecting and then subjecting the focussed beam to an additional static deflecting filed to deflect the beam a second time and to obtain the vertical impact angle.

4. A method according to claim 2, wherein the electron beam is projected parallel to the matrix of photoconductive devices and wherein the step of controlling includes the deflecting of the beam into a curved path to project with a vertical angle of impact on the column of photoconductive devices with the degree of curvature of the path being varied to project the beam on different columns of photoconductive devices.

5. A method according to claim 1, wherein the matrix of photosensitive cells is a matrix of photoemissive devices emitting electrons when illuminated by light waves, said method including focusing the emitted electrons into an electronic image; wherein said step of collecting includes passing a portion of the electronic image created by a column of said matrix, through a slot-like aperture on to electron collector and wherein said step of scanning includes selectively shifting the electronic image with respect to the slot-like aperture to enable collection of the information for selected column of the matrix of photo devices.

6. An apparatus for retrieving information from a storage matrix of elements arranged in columns and rows comprising:
a matrix of photosensitive cells arranged in columns and rows with the matrix positioned on one side of an envelope for receiving information from light waves projected thereon from the storage matrix;
means disposed in the envelope for scanning all of the photosensitive cells in a column simultaneously to obtain the information contained therein; and
means disposed in the envelope for collecting the information released from the photosensitive cells of the scanned column and conducting the information out of the envelope.

7. An apparatus according to claim 6,
wherein each of the photosensitive cells is a photoconductive device,
wherein the means for collecting includes a plurality of conductors with all of the photodevices of one row electrically connected to a single conductor; and
wherein the means for scanning includes
means for projecting an electron beam having a width of a photodevice and a length of a column of devices to cause an electrical signal to flow from each of the photodevices in accordance with the information signal transferred thereto, and
means for controlling the path of the electron beam to selectively project on the selected column of photo devices with the beam having a substantially vertical angle of impact thereon.

8. In an apparatus according to claim 7, wherein said controlling means includes:
means for focusing the beam on the selected column by deflecting, and
means for providing an additional static deflecting field to deflect the focused beam a second time to obtain the vertical impact angle on the photo devices.

9. An apparatus according to claim 7,
wherein the means for projecting provides an electron beam extending substantially parallel to a face of the matrix of photo devices, and
wherein said means for controlling includes a positively biased rod electrode, a negatively biased electrode having a curved surface facing said rod electrode and having an axis of curvature parallel to the axis of the rod electrode, and means for varying the potential of the electrodes, said electrodes being parallel to the face of the matrix and with the electron beam passing therebetween so that the beam of electrons is deflected into a curved path to impact vertically on a selected column of photo devices with the amount of curvature being varied by the means varying the potential on the electrodes to select a different column on which the beam impacts.

10. An apparatus according to claim 6,
wherein the said matrix of photosensitive cells is a matrix of photoemissive devices emitting electrons when subjected to light waves,
said apparatus further including means for focusing the emitted electrons into an electronic image,
wherein the means for collecting includes a plurality of electron collectors with one for each photo device of a column and each of the collectors having a conductor extending out of the envelope, and baffle means disposed between the collectors and the matrix of photo devices defining a slot having a length and width of a size to pass the electron image from one column of photo devices through the slot and onto the collectors; and wherein the means for scanning includes means for shifting the electron image in a direction perpendicular to the slot to selectively pass the electron image from selected columns of photo devices through the slot onto the collectors.

11. A device according to claim 10, which further includes a cone-shaped shell-like electrode cooperating with the baffle means to form a corrective lens for the electronic image to limit distortion therein.

12. A device according to claim 10, which further includes each of the collectors having a secondary emission multiplier stage in the form of a channel amplifier connected in a circuit therewith so that an electrical signal generated in the collector by the electronic emission projected thereon is amplified.

* * * * *